United States Patent [19]

Eckle et al.

[11] 4,387,612

[45] Jun. 14, 1983

[54] TURNING HEAD, IN PARTICULAR A FACING HEAD

[75] Inventors: Otto Eckle; Paul Winger, both of Loechgau, Fed. Rep. of Germany

[73] Assignee: Komet Stahlhalter- und Werkzeugfabrik Robert Breuning GmbH, Besigheim, Fed. Rep. of Germany

[21] Appl. No.: 210,904

[22] Filed: Nov. 28, 1980

[30] Foreign Application Priority Data

Dec. 29, 1979 [DE] Fed. Rep. of Germany ... 7936754[U]

[51] Int. Cl.³ .................... B23B 3/26; B23B 29/34
[52] U.S. Cl. .................... 82/2 E; 82/1.2; 82/2 A; 409/146
[58] Field of Search ............... 82/2 E, 2 A, 1.2, 1.3, 82/1.4, 22, 27; 409/146

[56] References Cited

U.S. PATENT DOCUMENTS

| | | | |
|---|---|---|---|
| 2,002,991 | 5/1935 | De Vlieg | 409/146 |
| 2,059,091 | 10/1936 | De Vlieg | 409/146 |
| 2,404,433 | 7/1946 | Christman | 82/2 E |
| 2,773,432 | 12/1956 | De Vlieg et al. | 409/146 |
| 2,826,928 | 3/1958 | Kearns | 82/2 E |
| 3,113,475 | 12/1963 | Lombardo | 82/2 E |
| 3,119,307 | 1/1964 | Opferkuch | 409/146 |
| 3,169,416 | 2/1965 | Carlson et al. | 82/1.4 |
| 3,599,517 | 8/1971 | Muller | 82/2 E |
| 4,004,332 | 1/1977 | Wawrzyniak | 82/2 E |
| 4,184,391 | 1/1980 | Eckle | 82/2 E |

FOREIGN PATENT DOCUMENTS

| | | | |
|---|---|---|---|
| 2737281 | 2/1979 | Fed. Rep. of Germany | 82/2 E |
| 2066128 | 7/1981 | United Kingdom | 82/2 E |

Primary Examiner—Leonidas Vlachos
Assistant Examiner—Jerry Kearns
Attorney, Agent, or Firm—Flynn, Thiel, Boutell & Tanis

[57] ABSTRACT

The turning head comprises a support member (1) which is to be secured to the spindle of a machine tool. The support member (1) has a radially adjustable slider (4) which carries a tool (5). An adjusting rod (7) is displaceable coaxially with respect to the support member (1) and acts on at least one helically toothed rack (8) which is axially movable in the support member (1). Arranged on the slider (4) is a toothed bar (10) which extends in the direction of movement thereof and whose inclined teeth (10a) mesh with those of the rack (8) and are inclined at the same angle ($\beta$) as the teeth of the rack (8), with respect to the axis of rotation of the support member (1). Provided on the slider (4) is an additional toothed bar (11) which extends in the direction of movement (V) of the slider (4) and which co-operates with an additional rack (15) which is axially movable in the support member (1) and which is braced against the support member (1) or the adjusting rod (7) or a member (7a) which is rigidly connected thereto, with the interpositioning of a prestressed spring assembly (16) in such a way that the spring assembly (16) applies to the slider (4) a force (P) which is directed radially inwardly towards the axis of rotation (A—A).

6 Claims, 5 Drawing Figures

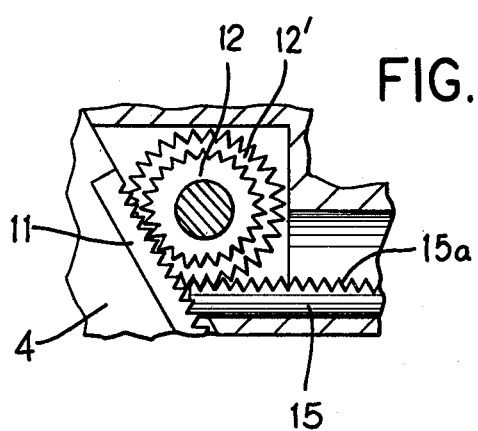

TURNING HEAD, IN PARTICULAR A FACING HEAD

FIELD OF THE INVENTION

This invention relates to an apparatus for supporting a tool on a rotatable spindle of a machine tool and, more particularly, to such an apparatus which includes a radially movable slider which supports the tool and a mechanism which counteracts centrifugal forces which act on the slider.

BACKGROUND OF THE INVENTION

The invention relates to a turning head, in particular a facing head, essentially comprising a support member which is to be secured to the spindle of a machine tool, having at least one radially extending guide means for a radially adjustable slider carrying a tool, an adjusting rod which is movable coaxially with respect to the support member and which acts on at least one helically toothed rack which is axially movable in the support member, and a toothed bar which is arranged on the slider and which extends in the direction of displacement thereof and whose helical teeth mesh with those of the rack and are inclined at the same angle as the rack teeth with respect to the axis of rotation of the support member.

Known turning heads of this kind have one or generally two sliders which are arranged at positions spaced apart by 180° in the peripheral direction and which are displaceable in opposite directions and which each carry a tool. If the guide means for the sliders are arranged in planes which extend perpendicular to the axis of rotation of the support member, such turning heads are mainly suitable for producing flat end surfaces on workpieces. Such turning heads are then also referred to as facing heads. However, there are also turning heads in which the radially extending guide means are inclined for example at an angle of 60° with respect to the axis of rotation of the support member. Turning heads of this kind are frequently used for copying purposes.

Radial displacement of the sliders is effected, while the turning head is rotating, by means of the adjusting rod which is arranged coaxially in the support member and which acts on the above-mentioned helically toothed racks. Now, it has been found that, at the rotary speeds of 1200 r.p.m. which are generally used to date, a considerable amount of wear occurs at the racks and the toothed bars of the sliders, which co-operate with the racks. This is to be attributed to the fact that not just machining forces but also considerable centrifugal forces act on the sliders, and such forces increase in proportion to outward displacement of the sliders. The sides of the teeth which carry the radially outwardly directed forces are subjected to a very severe degree of wear, which results in a considerable reduction in the accuracy of adjustment of the sliders and thus the accuracy of working of the turning head. Indeed, the wear on the sides of the teeth results in play between the forward and backward movement of the rack and thus also between the radially inwardly or radially outwardly directed movement of the slider. This play results in inaccuracies in the radial adjustment of the sliders, and this is a disadvantage in particular in copying turning operations as in such an operation the direction of movement of the sliders is reversed one or more times during the copying process.

The invention is now based on the problem of providing a turning head, in particular a facing head, of the above-indicated kind, wherein wear of the racks and toothed bars which are provided for displacement of the sliders is reduced or substantially eliminated, without detrimentally affecting the radial adjustment travel of the slider, and while being of compact and simple construction.

SUMMARY OF THE INVENTION

According to the invention, this is achieved in that an additional toothed bar which extends in the direction of movement of the slider is arranged on the slider and co-operates with an additional rack which is axially movable in the support member and which is braced against the support member or the adjusting rod or a member which is rigidly connected thereto, with the interposition of a prestressed spring assembly, in such a way that the spring assembly applies to the slider a force which is directed radially inwardly toward the axis of rotation.

The invention is therefore based on the concept of applying to the slider a radially inwardly directed force which is produced by a spring assembly and which acts against centrifugal force. The return force of the spring assembly reduces the centrifugal forces so that the amount of wear which occurs at the toothed bars and racks which are provided for adjustment purposes is substantially reduced. This means that the working accuracy of the turning head is also maintained over a long period of time. In this connection, it is inevitable that the additional toothed bars and racks are subjected to a certain amount of wear, but this is of no importance as the accuracy of adjustment depends only on the accuracy of the toothed bars and racks provided for the adjustment movement. As the spring assembly and the additional rack are arranged for axial displacement, the radial dimensions of the turning head are not increased by the additional components required. In particular also, such components are not moved radially outwardly by centrifugal force. As the centrifugal forces acting on the slider are substantially compensated for, lower forces are required to produce radial adjustment of the slider and higher speeds of rotation can be achieved as the toothed bars and racks which provide for the adjustment movement operate substantially without wear. Therefore, besides an increase in working accuracy, the turning head according to the invention also has the advantage of a higher working speed.

As the centrifugal force increases with adjustment of the slider in a radially outward direction, it is advantageous for the opposing return force of the spring assembly also to increase upon adjustment of the slider in a radially outward direction. There are two possible ways of achieving this.

The first way provides that the prestressed spring assembly is supported against a member (flange plate) which is rigidly connected to the support member so that the force which is directed radially inwardly towards the axis of rotation increases with adjustment of the slider radially outwardly. In this arrangement, the return force of the spring assembly does not remain constant, but, upon displacement of the slider outwardly, the spring assembly is compressed by corresponding displacement of the rack towards the member which is rigidly connected to the adjusting rod. This causes the return force of the spring assembly and thus the radially inwardly directed force acting on the silder to be increased.

When two pinions are used between the toothed bar and the additional rack, another possible design provides that the diameter of the second pinion is greater than that of the first pinion so that the force which is directed radially inwardly towards the axis of rotation increases with displacement of the slider radially outwardly. In this case also, the spring assembly is compressed upon displacement of the slider in a radially outward direction.

These two possible designs may possibly also be combined, in order to provide for optimum compensation of the centrifugal force.

BRIEF DESCRIPTION OF THE DRAWINGS

Further advantageous embodiments are set forth in the other subsidiary claims.

The invention is described in greater detail hereinafter with reference to embodiments illustrated in a drawing in which:

FIG. 5 is a fragmentary longitudinal sectional view of an alternative embodiment of the turning head of FIG. 1.

DETAILED DESCRIPTION

Figure 1:
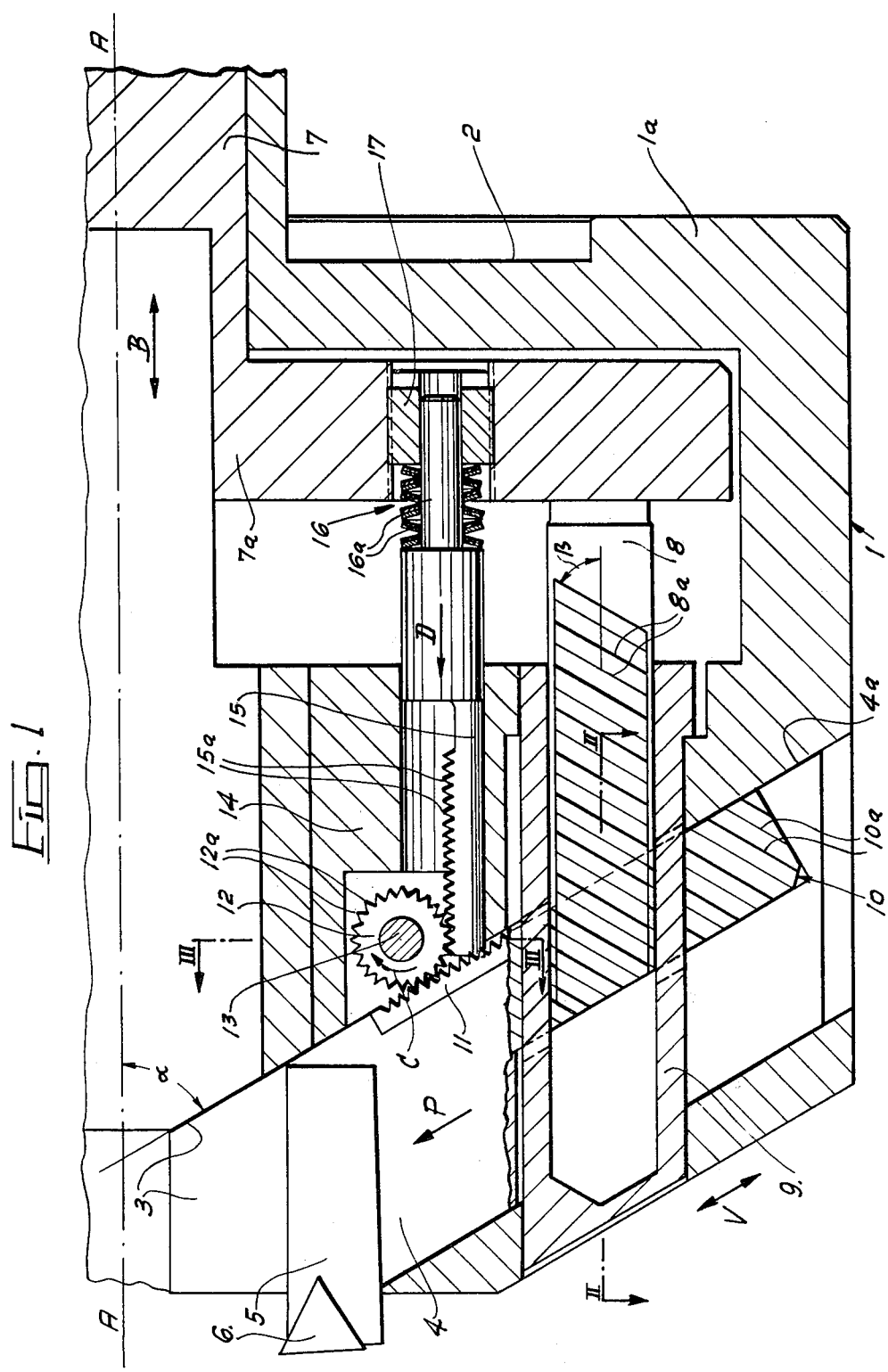
FIG. 1 shows a view in longitudinal section through one half of a copying turning head.

In the drawing, reference numeral 1 denotes a cylindrical support member or frame of a copying turning head, which may comprise a plurality of parts. For the sake of simplicity and ease of viewing however, the support member is illustrated in the drawing as being a one-part member. At its rear, the support member 1 has a flange plate 1a with a centering recess 2 which fits on to the spindle of a turning or special-purpose machine. The support member 1 can be secured to the spindle by means of the flange plate 1a.

At the front of the support member 1, there are two guide means 3 which are arranged at positions of being displaced relative to each other through 180° in the peripheral direction, only one guide means 3 being shown in the drawing. The guide means extend radially and, in the illustrated embodiment, are inclined at an angle $\alpha$ of 60° with respect to the axis of rotation A—A of the support member 1, which coincides with the spindle axis. Arranged in each of the guide means 3 is a slider 4 which is adjustable in the direction V and which carries a tool 5 with an interchangeable cutting plate 6.

An adjusting rod 7 is arranged in the support member 1 displaceably in the axial direction B, being coaxial and concentric with respect to the support member 1. The adjusting rod 7 carries a flange 7a at its front end. Fixedly connected to the flange 7a, for each of the sliders 4, is a rack 8 which is axially movable in a guide bush 9. The rack 8 has helical or inclined teeth 8a on both sides thereof, the teeth of the rack on both sides being inclined at the same angle $\beta$ of 60° with respect to the axis A—A. Provided on the slider 4 are two toothed bars 10, the helical or inclined teeth 10a of which engage the inclined teeth 8a and are inclined at the angle $\beta$ with respect to the axis of rotation A—A, like the teeth 8a. When the adjusting rod 7 is moved in the axial direction B, the slider 4 is adjusted in the direction V by the same amount during rotation of the support member, by means of the rack 8 and the toothed bars 10. If the adjusting rod 7 is moved rearwardly, that is to say, towards the right in FIG. 1 with respect to the support member 1, the slider 4 is adjusted radially outwardly, and vice-versa. The greater the radial distance of the centre of gravity of the slider from the axis of rotation A—A, the greater are the centrifugal forces acting on the slider.

In order to compensate for such centrifugal forces and in order to reduce the wear at the rack 8 and the toothed bars 10, an additional toothed bar 11 is arranged on the slider 4, and extends in the direction of movement V thereof. The additional toothed rack is desirably arranged on the rear side 4a of the slider 4, which is remote from the tool 5, 6. It meshes with a pinion 12 which is rotatable about a spindle 13 which extends perpendicular to the direction of movement V and parallel to the rear side 4a. The spindle 13 is arranged in a mounting bush 14 which is rigidly mounted in the support member 1. The teeth 12a of the pinion 12 also mesh with the teeth 15a of an additional rack 15 which is movable in the mounting bush 14 axially, that is to say, parallel to the axis of rotation A—A of the support member 1. The additional rack 15 bears against an adjusting screw 17 which is axially screwable in the flange 7a, by way of a spring assembly 16 comprising a plurality of plate springs 16a. The prestressing of the spring assembly 16 can be set by means of the adjusting screw 17.

Now, the spring assembly applies to the rack 15 a force which is directed axially forwardly, that is to say, towards the left in direction D in FIG. 1, and causes the pinion to rotate in the clockwise direction C. As however the pinion 12 also meshes with the additional toothed bar 11, a force P which is directed radially inwardly towards the axis of rotation A—A is exerted on the slider 4. FIG. 1 shows the slider in its most radially outward position. When the adjusting rod 7 is moved forwardly, that is to say, towards the left in FIG. 1, the slider 4 is moved radially inwardly by means of the rack 8 and the toothed bars 10, that is to say, it is moved upwardly in FIG. 1. When this occurs, the pinion 12 can now rotate in the direction indicated by arrow C, whereby the additional rack 15 moves forwardly in direction D, as at the same time the flange 7a also moves forwardly over the same distance, the prestressing of the spring assembly 16 remains constant. Therefore, the spring assembly 16, the additional rack 15, the pinion 12 and the toothed bar 11 apply to the slider a radially inwardly directed force P which is constant over the adjustment travel thereof and which opposes the centrifugal force. So that the same sides of the teeth in the rack 8 and the toothed bars 10 always bear against each other thereby to avoid play between the sides of the teeth, it is advantageous for the prestressing force of the spring assembly to be such that, even when the slider 4 is moved inwardly to its most radially inward position, there is still a residual centrifugal force predominating which, although it then increases continuously in an outward direction, does not thereby change its direction and cause any markings on the turned surface of the work. In this arrangement, although the centrifugal forces are not completely compensated, they are at least reduced. The wear on the toothed bars 10 and the rack 8 is thus substantially reduced and the accuracy of adjustment is maintained over a longer period of operation. Although the teeth on the additional toothed bar 11, the pinion 12 and the additional rack 15 are subject to wear, this wear does not play any part with regard to the accuracy of adjustment of the tool.

The invention is not to be limited to the foregoing embodiment. While, in the foregoing embodiment, there is a transmission ratio of 1:1 between the additional toothed bar 11 and the additional rack 15, this transmission ratio could also be varied, as shown in FIG. 5, by connecting to the pinion 12 a second pinion 12' of larger diameter, on the same spindle, the pinion 12 then meshing with the toothed bar 11 and the larger pinion 12' meshing with the rack 15. Because of the different transmission ratio, the whole arrangement can then be better adapted to the spring characteristic of the spring assembly 16, thereby to provide even more accurate compensation for centrifugal forces. If, in this arrangement, the slider 4 is moved outwardly by the rack 8 and the toothed bar 10, the flange 7a is displaced to the same extent towards the right as in FIG. 1. As however there is a different transmission ratio between the first and the second pinion, the larger second pinion 12' causes the rack 15 to be moved towards the right by a greater amount than the flange 7a. This causes an increase in the prestressing of the spring assembly 16 which then opposes the higher centrifugal forces when the slider 4 is displaced in an outward direction. In this way it is possible to provide almost complete compensation for the centrifugal forces, and to prevent them from acting on the toothed bars 10 and the rack 8. Wear at these points is thus substantially eliminated and the accuracy of adjustment is maintained over an even longer period of operation.

Figure 2:
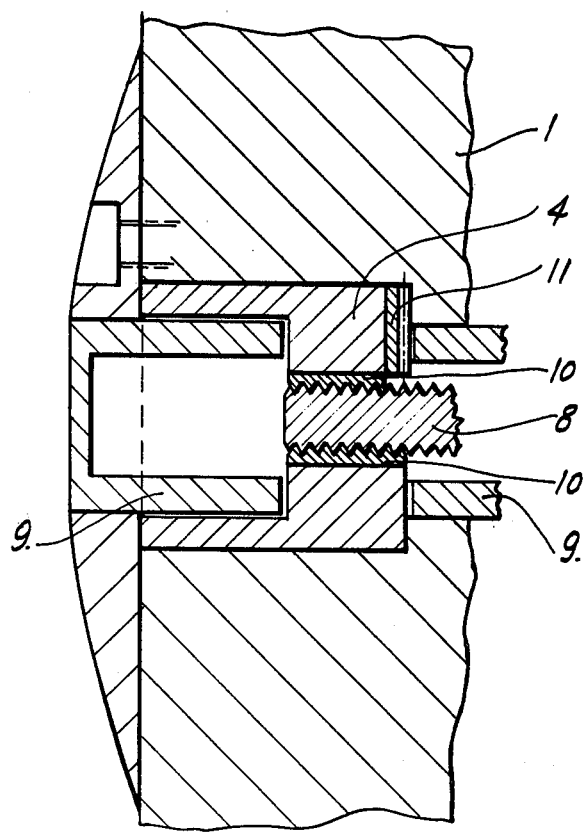
FIG. 2 shows a view in longitudinal section taken along line II—II in FIG. 1 of part of the turning head.
Figure 3:
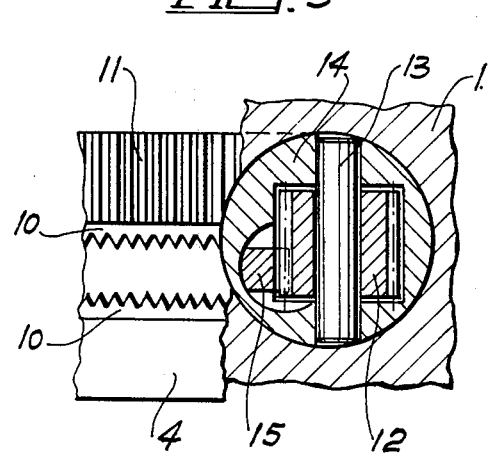
FIG. 3 shows a view in cross-section taken along line III—III in FIG. 1 of part of the turning head.
Figure 4:
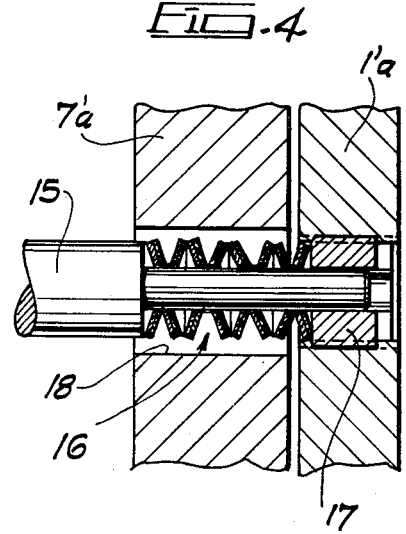
FIG. 4 shows a view in longitudinal section through part of a second embodiment.

While, in the embodiment shown in FIGS. 1 to 3, the spring assembly bears against the adjusting rod 7 by way of the flange 7a, it may optionally also bear against the flange plate 1'a of the support member, as shown in FIG. 4. In this arrangement, the flange 7'a has a through bore 18 of suitably large diameter for the additional rack 15 and the spring assembly 16 to pass therethrough. This arrangement gives the advantage that the forces of the spring assembly 16 and centrifugal force are kept from acting on the adjusting rod 7 and therefore also do not have to be overcome by the traction rod actuating means. In addition, when the slider 4 is displaced outwardly, the rack 15 is moved towards the right and thus compresses the spring assembly 16. This causes an increase in the return force of the spring assembly and thus also the radially inwardly directed force acting on the slider 4. Thus, an increasing centrifugal force is counteracted by an increasing return force which provides for substantial compensation for the centrifugal force.

It would also be possible, instead of the transmission of force by means of a pinion, to provide for direct transmission of force from the additional rack which is subjected to the force of the spring assembly, to one or more toothed bars which are arranged on the slider. For this purpose, the additional rack would also have to have helical or inclined teeth, similar to the rack 8. The toothed bars which mesh with said rack would then have extension portions into which the helically toothed additional rack engages. Similar to the rack 8, the additional rack would then also be provided with helical or inclined teeth on both sides. With this embodiment as described, the pinion could be omitted. The rack 8 and the additional rack would of course have to be arranged at such a spacing from each other that the additional rack never engages into that region of the toothed bars, into which the rack 8 engages.

The invention was described with reference to the drawing, by reference to a copying turning head having two oppositely movable sliders, the guide means of which are inclined at an angle of 60° with respect to the axis of rotation A—A. However, the invention may also be used with the same advantages in so-called facing heads in which the slider guide means are arranged in a plane which extends perpendicular to the axis of rotation. The invention can equally be used in turning heads in which there is only one slider. In each case, the speed of rotation of the turning head can also be substantially increased, due to substantial compensation for centrifugal forces. The turning head according to the invention has, to date, achieved a speed of 2000 r.p.m. without any wear worth mentioning occurring at the toothed bars and racks which provide for adjustment movement.

We claim:

1. In an apparatus for supporting a tool on a rotatable spindle of a machine tool, including a frame adapted to be secured to the spindle, a slider supported on the frame for movement radially of the axis of rotation of the spindle, having means for supporting the tool thereon and having a toothed first rack thereon extending in the direction of movement thereof, an adjusting member movably supported on said frame and having teeth thereon which operatively engage the teeth of said first rack, movement of said adjusting member effecting radial movement of said slider and said slider being urged radially outwardly by centrifugal forces generated by rotation of the spindle, and counteracting means for exerting a radially inwardly directed force on said slider to counteract centrifugal forces acting thereon, the improvement comprising wherein said counteracting means includes a toothed second rack on said slider extending in the direction of movement thereof, pinion means rotatably supported on said frame and having teeth operatively engaging the teeth of said second rack, an axially extending third rack having teeth operatively engaging teeth of said pinion means and means supporting said third rack for axial movement relative to said frame, and resilient means cooperable with said third rack and one of said frame and adjusting member for yieldably urging axial and rotational movement of said third rack and pinion means, respectively, in directions which correspond to radially inward movement of said slider.

2. The tool support apparatus of claim 1, wherein said resilient means includes a spring cooperable with said third rack and with said adjusting member which urges axial movement of said third rack relative to said adjusting member, and wherein said second and third racks both engage the same set of teeth on said pinion means, whereby said radially inward force exerted by said counteracting means on said slider is substantially constant in all operational positions of said slider.

3. The tool support apparatus of claim 2, including means for adjusting the tension of said spring.

4. The tool support apparatus of claim 1, wherein said resilient means includes a spring cooperable with said third rack and with said adjusting member for urging relative movement therebetween, and wherein said pinion means includes first and second coaxial pinions fixed against relative rotation, said second pinion being of greater diameter than said first pinion and the teeth of said second and third racks respectively engaging the teeth of said first and second pinions, whereby said radially inward force exerted by said counteracting means on said slider increases as said slider is moved radially outwardly.

5. The tool support apparatus of claim 1, wherein said resilient means includes a spring cooperable with said third rack and with said frame which urges axial movement of said third rack relative to said frame, and wherein said second and third racks both engage the same set of teeth on said pinion means, whereby said spring is compressed and said radially inward force exerted by said counteracting means on said slider increases as said slider is moved radially outwardly.

6. The tool support apparatus of claim 1, wherein said teeth of said first rack are inclined with respect to the axis of rotation of said spindle and wherein said adjusting member includes a toothed fourth rack extending axially and supported for axial movement, said teeth on said adjusting member being the teeth of said fourth rack and being inclined to the axis of rotation of said spindle at the same angle as said teeth of said first rack.

* * * * *